United States Patent [19]

Baker

[11] Patent Number: 4,635,119
[45] Date of Patent: Jan. 6, 1987

[54] INTEGRATED CIRCUIT OF A DIGITAL FILTER FOR THE LUMINANCE CHANNEL OF A COLOR-TELEVISION RECEIVER

[75] Inventor: Peotr Baker, Allington, Great Britain

[73] Assignee: ITT Industries, Inc., New York, N.Y.

[21] Appl. No.: 654,635

[22] Filed: Sep. 24, 1984

[30] Foreign Application Priority Data

Sep. 24, 1983 [EP] European Pat. Off. ........ 83109517.9

[51] Int. Cl.⁴ ............................................. H04N 5/21
[52] U.S. Cl. ........................................ 358/166; 358/39
[58] Field of Search ................... 358/166, 37, 39, 167, 358/36

[56] References Cited

U.S. PATENT DOCUMENTS 4,107,736 8/1978 Lowry ................................. 358/37
4,249,209 2/1981 Storey ................................ 358/167
4,399,461 8/1983 Powell ............................... 358/166

OTHER PUBLICATIONS

Digital Pal-Decoder, By W. Weltersbach, et al., Fernseh-Und Kino-Technik, 35. Jahrgang, Nr. 9/1981, pp. 317-323.

Primary Examiner—Tommy P. Chin
Attorney, Agent, or Firm—Donald J. Lenkszus

[57] ABSTRACT

In an integrated circuit of a digital peaking filter for the digital luminance channel of a color-television receiver a DC component of the amplitude characteristic independent of the peaking factor is achieved by cascading a first subnetwork and a second subnetwork. The first subnetwork includes a first delay element and an adder at the input end of the digital filter. The output of the adder is coupled to the inputs of second and third delay elements and to the minuend input of a first subtracter. The first subtracter has its output connected to the input of a fourth delay element and to the subtrahend input of a second subtracter. The output of the second subtracter is coupled through a multiplier to the subtrahend input of a third subtracter whose minuend input is connected to the output of the second delay element. The output of the third subtracter is the digital filter output. The peaking factor is applied to the multiplier.

18 Claims, 6 Drawing Figures

INTEGRATED CIRCUIT OF A DIGITAL FILTER FOR THE LUMINANCE CHANNEL OF A COLOR-TELEVISION RECEIVER

BACKGROUND OF THE INVENTION

This invention pertains to an integrated circuit of a digital filter used in the digital luminance channel of a color-television receiver to give image enhancement ("peaking").

A digital filter of this kind is shown in the journal "Fernseh- und Kinotechnik", 1981, page 319, FIG. 4. It contains a first cascade of subnetworks the first of which includes a first delay element and a first adder for the input and output signals of the first delay element. The second cascade of subnetworks contains a second delay element, a multiplier, one input signal of which is a measure of the factor determining the image enhancement, the peaking factor k, and a summer which delivers the output signal of the digital filter. The first and second inputs of the summer are connected to the output of the second delay element and to the output of the multiplier, respectively. The delay provided by each of the delay elements is an integral multiple of the period of the clock signal of the digital filter. The clock signal frequency is equal to four times the chrominance-subcarrier frequency. From the complete network structure of this digital filter, it follows that the filter weights input signals of zero frequency differently, namely depending on the peaking factor. Therefore, different amplitude characteristics achieved by varying this factor have different DC components. If, however, this digital filter is used in the digital luminance channel of a color-television set, this property must be compensated for, i.e., the above prior art arrangement requires at least one additional multiplier which compensates for the above-mentioned dependence on the peaking factor. The additional multiplier is not shown in the above-mentioned FIG. 4 of the cited reference but its presence follows from the amplitude characteristics of FIG. 5 on page 319, where these characteristics have a constant DC component.

The digital filter described in the prior art reference thus contains a total of three multipliers, so that the overall circuit is quite expensive.

SUMMARY OF THE INVENTION

Accordingly, an object of the invention is to improve the prior art digital filter in such a way that the additional, amplitude-compensating filter, in particular, can be dispensed with, i.e., different amplitude characteristics are to have the same DC component for different values of the peaking factor. Two advantageous properties of the prior art digital filter are to be preserved, namely that it has a constant group delay, and that the step response always has only a single overshoot.

In accordance with the invention an integrated circuit of a digital peaking filter for the digital luminance channel of a color-television receiver is provided. A DC component of the amplitude characteristic independent of the peaking factor is achieved by cascading a first subnetwork and a second subnetwork. The first subnetwork includes a first delay element and an adder at the input end of the digital filter. The output of the adder is coupled to the inputs of second and third delay elements and to the minuend input of a first subtracter. The first subtracter has its output connected to the input of a fourth delay element and to the subtrahend input of a second subtracter. The output of the second subtracter is coupled through a multiplier to the subtrahend input of a third subtracter whose minuend input is connected to the output of the second delay element. The output of the third subtracter is the digital filter output. The peaking factor is applied to the multiplier.

BRIEF DESCRIPTION OF THE DRAWINGS

The invention will now be explained in more detail with reference to the accompanying drawings, in which.

DETAILED DESCRIPTION

Figure 1:
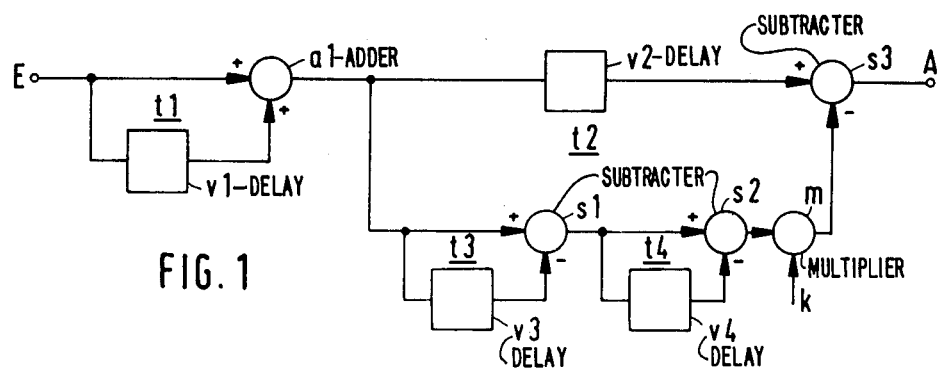
FIG. 1 shows an embodiment of the invention in a usual schematic digital filter diagram.

FIG. 1 shows an embodiment of the invention in the form of a usual schematic digital filter diagram. The schematic representation shows the components essential for the filter response, namely delay elements v . . . , the multiplier m, adders a . . . , and subtracters s . . . , interconnected so as to illustrate the signal flow. Each of the delay elements v is assumed to give the same delay, namely a delay equal to the period of the clock signal of the digital filter. For the intended use of the filter in the digital luminance channel of a color-television set, the clock signal has four times the frequency of the chrominance subcarrier according to the respective color-television standard (PAL, NTSC, SECAM).

The interconnecting lines of FIGS. 1 to 4 are data lines which, in view of the high frequency of the clock signal, are preferably designed as buses for parallel data processing.

The embodiment of FIG. 1 comprises four subnetworks t1, t2, t3, t4. The first subnetwork t1 includes the first delay element v1 and the first adder a1, one input of which, together with the input of the first delay element v1, is connected to the input E of the digital filter, and the second input of which is connected to the output of the first delay element v1. The output of the first adder a1 is coupled to the input of the second subnetwork t2 and, consequently, to the inputs of the second and third delay elements v2, v3 and to the minuend input of the first subtracter s1, whose subtrahend input is connected to the output of the third delay element v3. The output of the first subtracter s1 is coupled to the input of the fourth subnetwork t4 and, thus, to the input of the fourth delay element v4 and to the minuend input of the second subtracter s2. Second subtracter s2 has its subtrahend input connected to the output of the fourth delay element v4. The output of the second subtracter s2 is coupled to one of the two inputs of the multiplier m, to whose other input the peaking factor k is applied.

The output of the second delay element v2 is coupled to the minuend input of the third subtracter s3, which has its subtrahend input connected to the output of the multiplier m, and whose output forms the output A of the digital filter. As mentioned above, in the embodiment of FIG. 1, the delay provided by each of the our delay elements v1 ... v4 is equal to the period of the clock signal of the digital filter.

Figure 5:
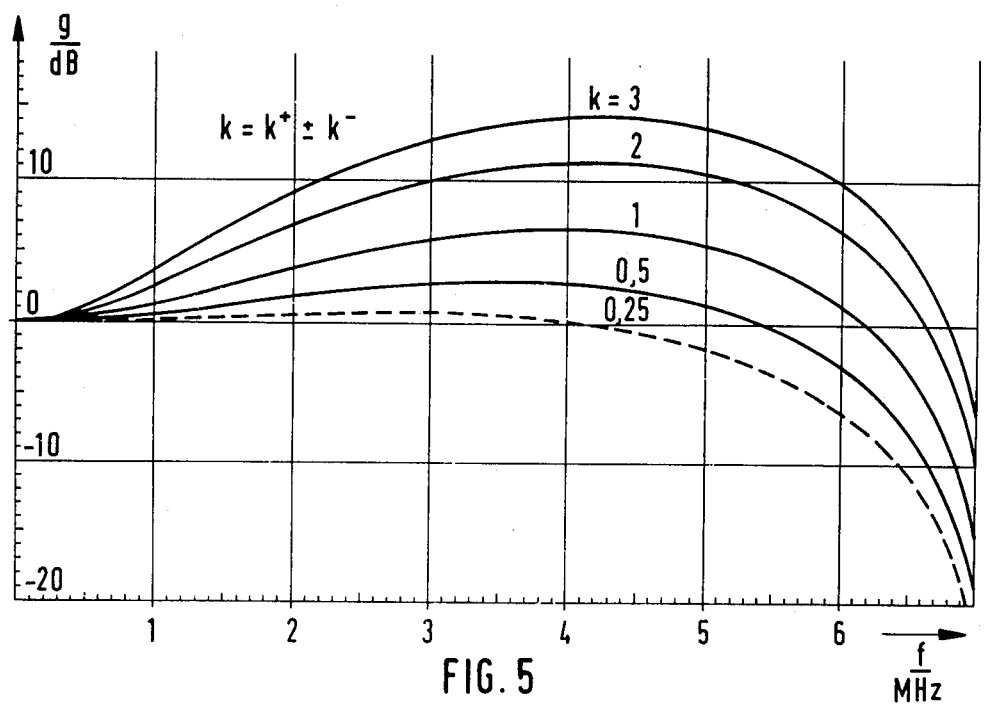
FIG. 5 shows amplitude characteristics for the embodiment of FIG. 1.

For different decimal numerical values of the peaking factor k, FIG. 5 shows the variation of the amplitude g with the frequency f of a digital filter as shown in FIG. 1, which is designed for the NTSC standard, with the attenuation pole located at twice the NTSC chrominance-subcarrier frequency.

Figure 2:
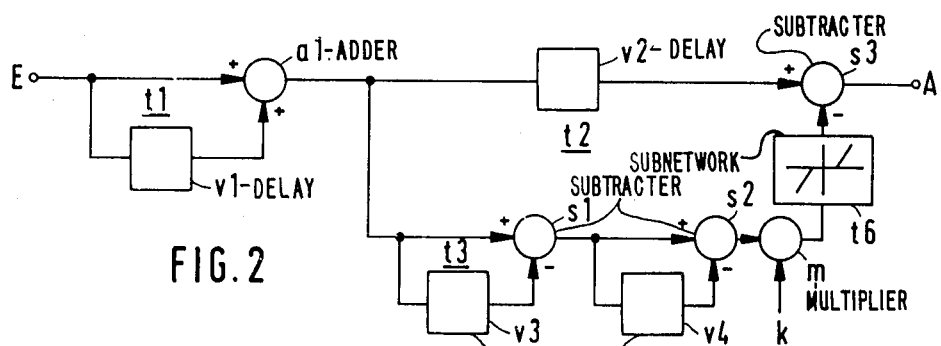
FIG. 2 is a circuit diagram of another embodiment of the invention.

FIG. 2 shows a variation of the arrangement of FIG. 1 which makes it possible to suppress small amplitudes in the filter output signal at higher frequencies which are generally due to noise or interference. To accomplish this, an additional subnetwork t6 is inserted between the output of the multiplier m and the subtrahend input of the third subtracter s3. It can have a nonlinear amplitude characteristic. In this embodiment, it has the amplitude characteristic indicated in FIG. 2, which is suitable for suppressing small signals. The other parts of the circuit diagram of FIG. 2 correspond to those of FIG. 1.

Figure 3:
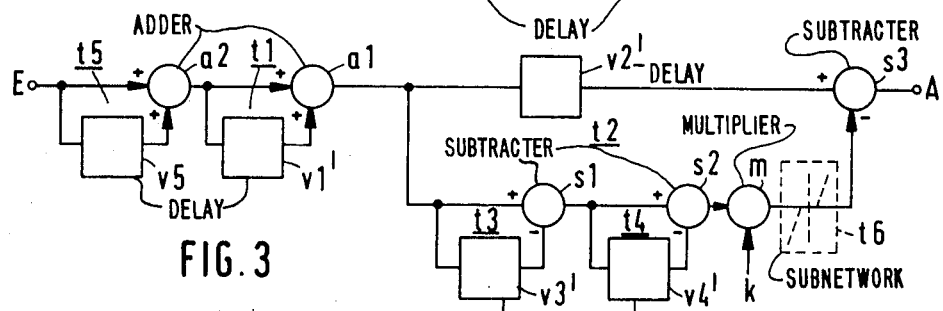
FIG. 3 is a circuit diagram of a further embodiment of the invention.

FIG. 3 shows a further embodiment of the invention, namely the circuit diagram of a digital filter suitable for PAL color-television receivers. The filter is also suitable for NTSC receivers if a chrominance-subcarrier trap is required i.e., for color-television receivers without comb filters. The arrangement of FIG. 3 differs from that of FIG. 1 in that the fifth subnetwork t5 has been added ahead of the first subnetwork t1, so that the input E of the digital filter is connected to the input of this fifth subnetwork t5. The latter consists of the fifth delay element v5 and the second adder a2, one input of which, together with the input of the fifth delay element v5, is connected to the input E, and the other input of which is connected to the output of the fifth delay element v5. The output of the second adder a2 is coupled to the input of the first subnetwork t1. The remainder of the circuit of FIG. 3 corresponds to the circuit of FIG. 1, except that the first to fourth delay elements are designated by the reference characters v1', v2', v3', v4', because in the embodiment of FIG. 3, each of these delay elements gives a delay equal to twice the period of the clock signal of the digital filter, while the fifth delay element v5 gives a delay equal to only one period of the clock signal.

In FIG. 3, the broken line indicates that, like in FIG. 2, the additional subnetwork t6 may be inserted.

Figure 6:
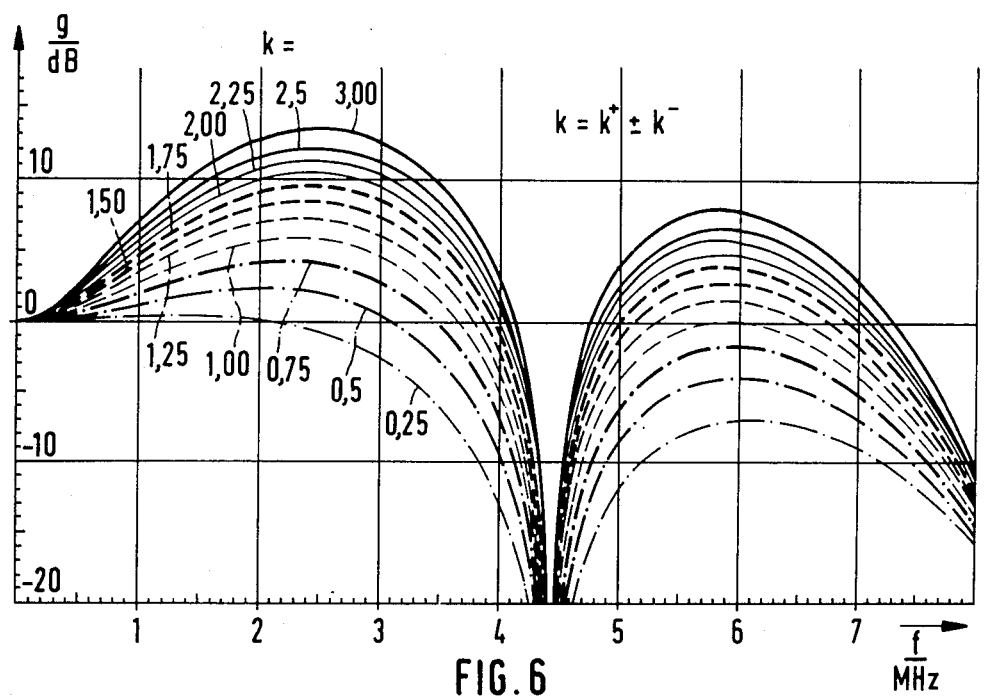
FIG. 6 shows corresponding amplitude characteristics for the embodiment of FIG. 3.

For different decimal numerical values of the peaking factor k, FIG. 6 shows the variation of the amplitude g with the frequency f of a digital filter for the PAL standard as shown in FIG. 3 but without the additional subnetwork t6. The family of curves has an attenuation pole at the PAL chrominance-subcarrier frequency (4.43 MHz).

Figure 4:
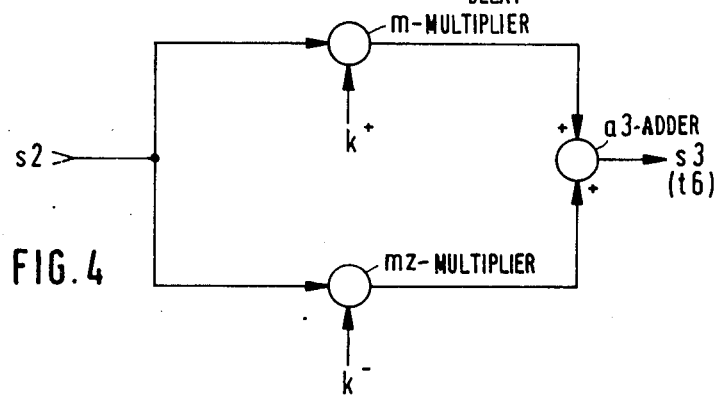
FIG. 4 is a circuit diagram for a special implementation of the multiplier of FIGS. 1 to 3.

FIG. 4 shows schematically a preferred implementation of the multiplier m if data signals are present in the pure binary code, and if decimal numerical values of the peaking factor k are in the form of powers of two. The multiplier m is fed with a first positive power of two, $k^+$, while a second power of two, $k^-$, or the number zero is fed to the additional multiplier mz, one input of which, together with one input of the multiplier m, is connected to the output of the second subtracter s2; both multipliers m, mz can be constructed as data selectors. The outputs of the multiplier m and the additional multiplier mz are each coupled to one input of the third adder a3, whose output is connected to the third subtracter s3 or to the additional subnetwork t6. It is thus possible to also implement rational numerical values of the peaking factor k, as is indicated by the numerical values in FIG. 6.

One of the advantages of the invention is that at zero frequency, the digital filter has a gain of $2^n$ ($n=0, 1, 2, 3 \ldots$) which is independent of the selected numerical value of the peaking factor k. Thus, the circuit produces no additional quantization noise. Another advantage is that the digital filter is also suitable for nonlinear signal processing without losing its properties, which is attainable simply by adding the above-mentioned sixth subnetwork t6. The digital filter is especially suited for implementation using insulated-gate field-effect transistor technology, i.e., so-called MOS technology.

What is claimed is:

1. An integrated digital filter circuit for use in a digital luminance channel of a color television receiver to provide image enhancement (peaking), said circuit comprising:

filter input and output terminals;
   a first and second subnetwork is connected in cascade between said filter input and output terminals;
   said first subnetwork comprising first input and first output terminals; a first delay element having its input coupled to said first input terminal; a first adder having a first input coupled to said first input terminal and the output of said first delay element; said first adder having its output coupled to said first output terminal;
   said second subnetwork comprising second input and output terminals; a third subnetwork having a third input terminal coupled to said second input terminal and having a third output terminal; a fourth subnetwork having a fourth input terminal coupled to said third output terminal and having a fourth output terminal; a multiplier having a first input receiving a factor determining the measure of image enhancement (peaking factor); a second input coupled to said fourth output terminal and having an output; a second delay element having an input coupled to said second input terminal and having an output; a third subtracter having a minuend input coupled to said second delay element output, a minuend input coupled to said multiplier output and having an output coupled to said filter output to deliver the output signal of said digital filter;
   said third subnetwork comprising a first subtracter having a minuend input coupled to said third input terminal, having a subtrahend input and having an output coupled to said third output; a third delay element coupled between said third input terminal and said first subtracter subtrahend input;
   said fourth subnetwork comprising a second subtracter having a minuend input coupled to said fourth input terminal, having a subtrahend input, and having an output coupled to said fourth output, a fourth delay element coupled between said fourth input terminal and said second subtracter subtrahend input;
   said first and second delay elements each providing a delay equal to an integral multiple of four times the period of a chrominance-subcarrier frequency used in said color television receiver.

2. An integrated circuit in accordance with claim 1 comprising:
   an additional subnetwork with a nonlinear amplitude characteristic, particularly a characteristic suitable for suppressing small signals, coupled between said multiplier output said third subtracter subtrahend input.

3. An integrated circuit in accordance with claim 2 for digital signals in binary code wherein the numerical values of said peaking factor are powers of two.

4. An integrated circuit in accordance with claim 3, wherein:
said factor is a first positive power of two; and said integrated circuit comprises:
an additional multiplier having one input connected to said second subtracter output, a second input fed with a second power of 2 or with the number zero, and having an output;
a third adder having a first input coupled to said multiplier output, a second input coupled to said additional multiplier output and said third adder having an output coupled to the input of said additional subnetwork.

5. An integrated circuit in accordance with claim 1, wherein:
each of said first, second, third and fourth delay elements provides a delay equal to four times the period of said chrominance subcarrier frequency.

6. An integrated circuit in accordance with claim 5 comprising:
an additional subnetwork with a nonlinear amplitude characteristic, particularly a characteristic suitable for suppressing small signals, coupled between said multiplier output said third subtracter subtrahend input.

7. An integrated circuit in accordance with claim 6 for digital signals in binary code wherein the numerical values of said peaking factor are powers of two.

8. An integrated circuit in accordance with claim 7, wherein:
said factor is a first positive power of two; and said integrated circuit comprises:
an additional multiplier having one input connected to said second subtracter output, a second input fed with a second power of 2 or with the number zero, and having an output;
a third adder having a first input coupled to said multiplier output, a second input coupled to said additional multiplier output and said third adder having an output coupled to the input of said additional subnetwork.

9. An integrated circuit in accordance with claim 5 for digital signals in binary code wherein the numerical values of said peaking factor are powers of two.

10. An integrated circuit in accordance with claim 9, wherein:
said factor is a first positive power of two; and said integrated circuit comprises:
an additional multiplier having one input connected to said second subtracter output, a second input fed with a second power of 2 or with the number zero, and having an output;
a third adder having a first input coupled to said multiplier output, a second input coupled to said additional multiplier output and said third adder having an output coupled to said third subtracter subtrahend input.

11. An integrated circuit in accordance with claim 1, comprising:
a fifth subnetwork connected between said first subnetwork and said filter input, said fifth subnetwork including a second adder having a first input coupled to said filter input, an output coupled to said first input terminal, and having a second input, said fifth subnetwork further including a fifth delay element coupled between said filter input and said second adder second input;
said first, second, third and fourth delay elements each having a delay equal to eight times said period, said fifth delay element having a delay equal to four times said period.

12. An integrated circuit in accordance with claim 11 comprising:
an additional subnetwork with a nonlinear amplitude characteristic, particularly a characteristic suitable for suppressing small signals, coupled between said multiplier output said third subtracter subtrahend input.

13. An integrated circuit in accordance with claim 12 for digital signals in binary code wherein the numerical values of said peaking factor are powers of two.

14. An integrated circuit in accordance with claim 13, wherein:
said factor is a first positive power of two; and said integrated circuit comprises:
an additional multiplier having one input connected to said second subtracter output, a second input fed with a second power of 2 or with the number zero, and having an output;
a third adder having a first input coupled to said multiplier output, a second input coupled to said additional multiplier output and said third adder having an output coupled to the input of said additional subnetwork.

15. An integrated circuit in accordance with claim 11 for digital signals in binary code wherein the numerical values of said peaking factor are powers of two.

16. An integrated circuit in accordance with claim 15, wherein:
said factor is a first positive power of two; and said integrated circuit comprises:
an additional multiplier having one input connected to said second subtracter output, a second input fed with a second power of 2 or with the number zero, and having an output;
a third adder having a first input coupled to said multiplier output, a second input coupled to said additional multiplier output and said third adder having an output coupled to said third subtracter subtrahend input.

17. An integrated circuit in accordance with claim 1 for digital signals in binary code wherein the numerical values of said peaking factor are powers of two.

18. An integrated circuit in accordance with claim 17, wherein:
said factor is a first positive power of two; and said integrated circuit comprises:
an additional multiplier having one input connected to said second subtracter output, a second input fed with a second power of 2 or with the number zero, and having an output;
a third adder having a first input coupled to said multiplier output, a second input coupled to said additional multiplier output and said third adder having an output coupled to said third subtracter subtrahend input.

* * * * *